United States Patent [19]

Nazaroff et al.

[11] Patent Number: 5,678,576
[45] Date of Patent: Oct. 21, 1997

[54] APPARATUS FOR TREATING ENVIRONMENTAL TOBACCO SMOKE (ETS) PARTICLE AND GAS-PHASE CONTAMINANTS

[76] Inventors: William W. Nazaroff, 123 Sonia St., Oakland, Calif. 94618; Ashok J. Gadgil, 438 Clayton Ave., El Cerrito, Calif. 94530

[21] Appl. No.: 369,464

[22] Filed: Jan. 6, 1995

[51] Int. Cl.$^6$ ..................................................... A41B 3/04
[52] U.S. Cl. ..................... 131/331; 131/230; 131/238
[58] Field of Search ........................... 131/230, 231, 131/238, 340, 341, 342; 55/385.8, 385.2, 467; 454/230, 231

[56] References Cited

U.S. PATENT DOCUMENTS

| | | | |
|---|---|---|---|
| 3,243,943 | 4/1966 | Getzin | 55/499 |
| 3,251,365 | 5/1966 | Keith II et al. | 131/340 |
| 3,860,404 | 1/1975 | Jochimski | 55/385 |
| 4,043,776 | 8/1977 | Orel | 55/385 |
| 4,119,419 | 10/1978 | Passaro et al. | 55/212 |
| 4,161,181 | 7/1979 | Nicks et al. | 131/231 |
| 4,177,045 | 12/1979 | Orel | 55/102 |
| 4,580,582 | 4/1986 | Grube et al. | 131/231 |
| 4,671,300 | 6/1987 | Grube et al. | 131/231 |
| 4,786,472 | 11/1988 | McConnell et al. | 422/61 |
| 4,963,171 | 10/1990 | Osendorf | 55/497 |
| 5,078,155 | 1/1992 | Grandel | 131/231 |
| 5,230,720 | 7/1993 | Kendall | 55/210 |
| 5,259,400 | 11/1993 | Bruno et al. | 131/238 |
| 5,322,473 | 6/1994 | Hofstra et al. | 454/186 |

Primary Examiner—V. Millin
Assistant Examiner—Charles W. Anderson
Attorney, Agent, or Firm—Fliesler, Dubb, Meyer & Lovejoy

[57] ABSTRACT

An apparatus for treating environmental tobacco smoke (ETS) using a high efficiency particle air filter (HEPA) is provided. The apparatus has a pleated HEPA filter positioned in the top of a housing for filtering ETS particle contaminants. Layers of granulated activated alumina and layers of granulated activated carbon are also positioned in the top of the housing to filter gas-phase ETS contaminants. The apparatus offers substantial improvements over commercially available "smokeless ashtrays" by more effectively 1) directing ETS smoke over filter components, 2) removing ETS particle contaminants and 3) removing ETS gas-phase contaminants. The apparatus also indicates the effectiveness of the treatment process and allows users to increase the effectiveness of the treatment process.

3 Claims, 7 Drawing Sheets

FIG. 7A-1
nicotine
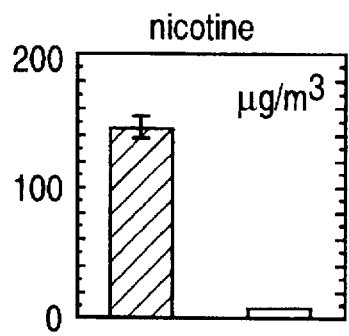
FIG. 7A-2
formaldehyde
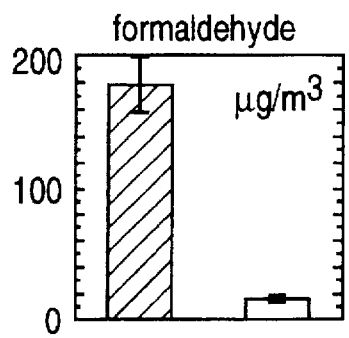
FIG. 7A-3
acetaldehyde
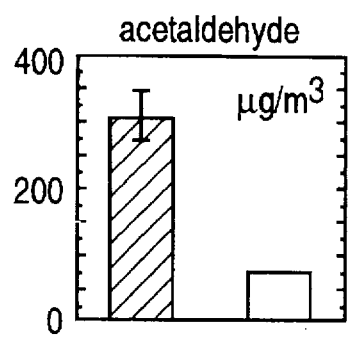
FIG. 7A-4
acrolein
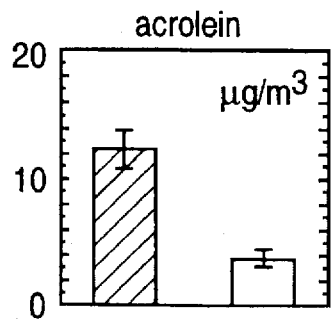
FIG. 7A-5
acrylonitrile
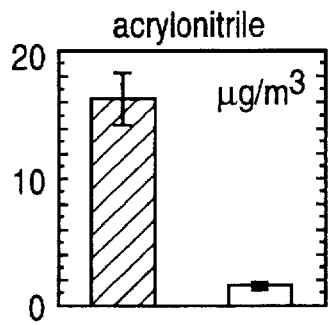
FIG. 7A-6
1,3-butadiene
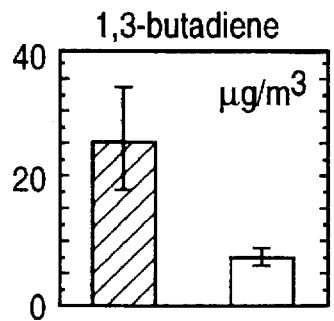
FIG. 7A-7
2-butanone
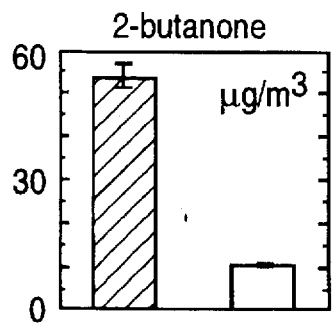
FIG. 7A-8
pyridine
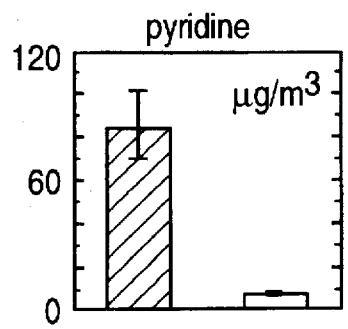
FIG. 7A-9
pyrrole
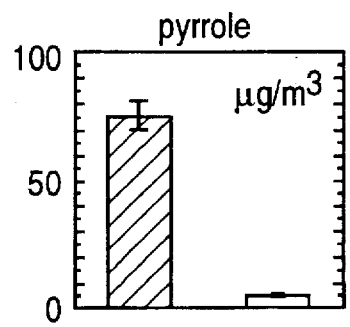
 uncontrolled
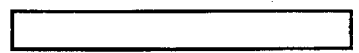 SA-4 Smokeless Ashtray

FIG. 7B-1
benzene
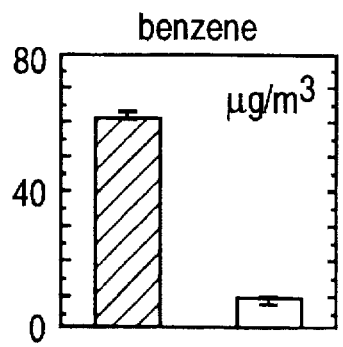
FIG. 7B-2
toluene
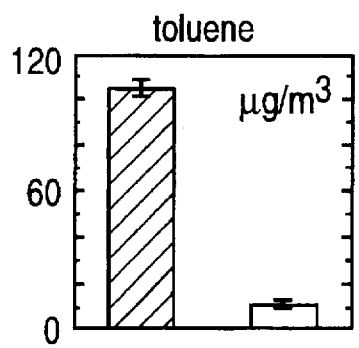
FIG. 7B-3
styrene
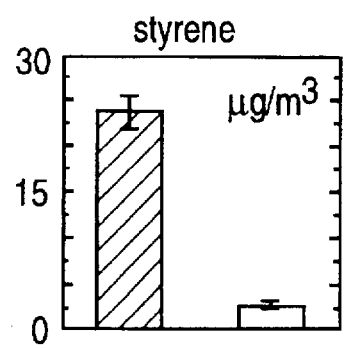
FIG. 7B-4
m,p-xylene
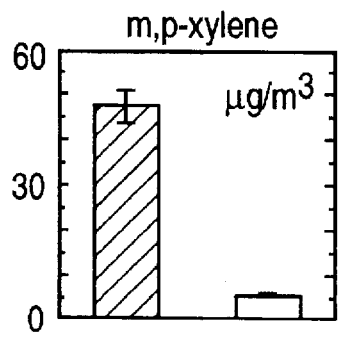
FIG. 7B-5
o-xylene
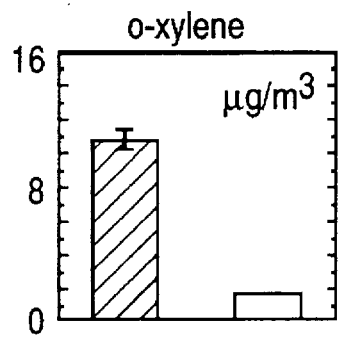
FIG. 7B-6
3-vinylpyridine
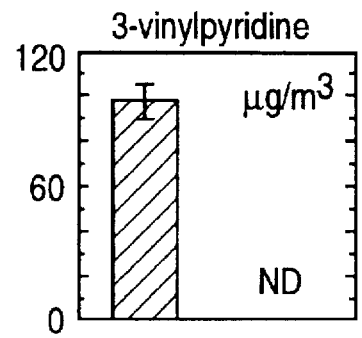
FIG. 7B-7
m,p-cresol
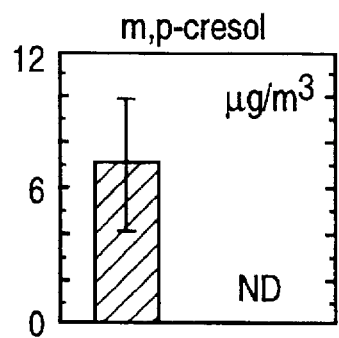
FIG. 7B-8
o-cresol
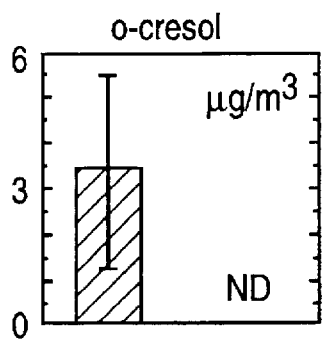
FIG. 7B-9
phenol
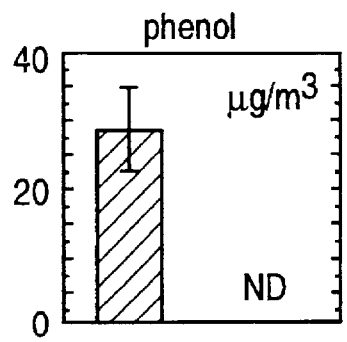
 uncontrolled
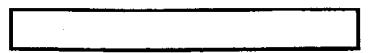 SA-4 Smokeless Ashtray

APPARATUS FOR TREATING ENVIRONMENTAL TOBACCO SMOKE (ETS) PARTICLE AND GAS-PHASE CONTAMINANTS

I. FIELD OF THE INVENTION

The present invention is directed toward treating environmental tobacco smoke (ETS). In particular, the present invention relates to an apparatus which reduces ETS particle and gas-phase contaminants.

II. BACKGROUND OF THE INVENTION

A. Description of the Related Art

Public awareness of the adverse health effects of passive smoking has resulted in a number of devices aimed at reducing non-smokers' exposure to environmental tobacco smoke (ETS).

ETS refers to the complex mixture of over 4,000 chemicals present in both particle and gas phases found in smoke from cigarettes, cigars, pipes and other tobacco products. The dominant contributor to ETS is the sidestream smoke (SS) which issues from a smoldering tobacco product. The minor contributor to ETS is the mainstream smoke (MS) exhaled by the smoker. Based on several studies, potential adverse health effects on humans from exposure to SS emissions have been found to be often greater than those from comparable exposure to MS emissions. Of particular concern is the finding that, of the five known and suspected human carcinogens present in ETS, SS emissions contain greater amounts of these carcinogens than MS emissions.

So called "smokeless ashtrays" have been used in order to attempt to reduce non-smokers' exposure to ETS. Smokeless ashtrays have been designed to treat the smoke from a smoldering tobacco product prior to release into the surrounding environment. While there are smokeless ashtrays commercially available, none of these apparata effectively reduce both ETS particle and gas-phase contaminants.

B. Patents and Literature

By way of example, the following United States patents and literature, all of which are incorporated by reference herein, discuss various aspects of treating tobacco smoke in the environment. The patents and literature include:

1. Patents

| U.S. Pat. No.: | Title: | Inventor(s) |
|---|---|---|
| 3,860,404 | FILTER APPARATUS WITH MOVEMENT MEANS | Jochimski |
| 4,043,776 | SMOKE SORBING DEVICE | Orel |
| 4,119,419 | SMOKE CONTROLLING ASH TRAY | Passaro, et al. |
| 4,161,181 | SMOKE FILTERING ASHTRAYS | Nicks, et al. |
| 4,177,045 | SELF-ACTING SMOKE SORBING DEVICE | Orel |
| 4,580,582 | SMOKELESS ASHTRAY | Grube, et al. |
| 4,671,300 | SMOKELESS ASHTRAY | Grube, et al. |
| 4,786,472 | AIR SAMPLING DEVICE | McConnell, et al. |
| 5,078,155 | ASHTRAY APPARATUS | Grandel |
| 5,230,720 | AIR PURIFYING SIDE TABLE | Kendall |
| 5,259,400 | SMOKELESS ASHTRAY | Bruno, et al. |
| 5,322,473 | MODULAR WALL APPARATUS AND METHOD FOR ITS USE | Hofstra, et al. |

2. Literature a. F. J. Offermann, R. G. Sextro, W. J. Fisk, T. D. Grimsrud, W. W. Nazaroff, A. V. Nero, K. L. Revzan and J. Yater, "Control of Respirable Particles in Indoor Air With Portable Air Cleaners," Atmospheric Environment, 19:1761 (1985).

b. W. W. Nazaroff, W. Y. Hung, A. G. B. M. Sasse and A. J. Gadgil, "Predicting Regional Lung Deposition of Environmental Tobacco Smoke Particles," Aerosol Science Technology, 19:243 (1993).

c. Military Standard#282, "Filter Units, Protective Clothing, Gas-Mask Components and Related Products: Performance Test Methods," United States Government Printing Office, Washington, D.C.(1953), p. 31.

Some of the above references disclose systems for reducing ETS. For example, U.S. Pat. No. 4,043,776 and U.S. Pat. No. 5,259,400 generally describe smokeless ashtrays which are commercially available. However, both smokeless ashtrays described in U.S. Pat. No. 4,043,776 and U.S. Pat. No. 5,259,400 utilize common plastic foam filters and are ineffective in removing significant amounts of ETS particle and gas-phase contaminants. Also, both commercially available smokeless ashtrays are ineffective at removing noxious odors found in ETS, and allow amounts of SS to escape the treating process.

U.S. Pat. No. 5,322,473 uses high efficiency particle air filters in treating ETS. However, the "Modular Wall Apparatus" described is cumbersome, complex, and costly. Many users interested in treating ETS may not have the necessary space and financial resources for the large, expensive modular unit. Furthermore, U.S. Pat. No. 5,322,473 does not significantly remove odorous ETS gas-phase contaminants.

Also, present smokeless ashtrays do not provide indications to the users of the effectiveness of the treatment process or how users can enhance the treatment process.

Accordingly, it is desired to provide a cost effective, compact apparatus which effectively reduces ETS odor, particle and gas-phase contaminants. It is also desirable to provide an apparatus which indicates an effective treatment process and allows the users to enhance the treatment of ETS.

III. SUMMARY OF THE INVENTION

Therefore, an apparatus is provided for effectively filtering environmental tobacco smoke (ETS) particle and gas-phase contaminants in a cost effective and compact manner.

This is accomplished in the present invention by an apparatus comprising a housing having a fan directing smoke toward a high efficiency particle air filter. The use and positioning of the filter in the top of the housing effectively removes ETS particle contaminants. ETS from a smoldering tobacco product is directed upward and across the filter before vertically exiting the housing thereby taking advantage of ETS's natural tendency to rise.

According to another aspect of the present invention, the high efficiency particle air filter has pleats.

According to yet another aspect of the present invention, means for filtering ETS gas-phase contaminants is also coupled to the housing. The means for filtering gas-phase contaminants includes a layer of granulated activated carbon and a layer of granulated activated alumina. The means for filtering ETS gas-phase contaminants also substantially reduces the noxious odor present in ETS.

According to yet another aspect of the present invention, the layer of activated carbon is about 2.5 cm thick and the layer of activated alumina is about 1.8 cm thick.

According to another aspect of the present invention, the apparatus includes means for ensuring minimal escape of untreated ETS from the housing allowing for efficient treatment of the ETS.

According to another aspect of the present invention, the apparatus includes a fan turn-off switch in order to conserve power when the tobacco product is removed from the apparatus for a period of time and a clogged HEPA filter indicator which alerts users to remove an ineffective HEPA filter.

According to still yet another aspect of the present invention, the apparatus includes a small, high intensity lamp positioned on the apparatus to demonstrate to users the effectiveness of the treatment process. The apparatus also includes an alarm set to expire after a user removes a tobacco product from the apparatus for a period of time. The alarm reminds the user to return the tobacco product to the apparatus.

Other aspects and advantages of the present invention can be seen upon review of the figures, the detailed description, and the claims which follow.

IV. BRIEF DESCRIPTION OF THE DRAWINGS

Figure 2:
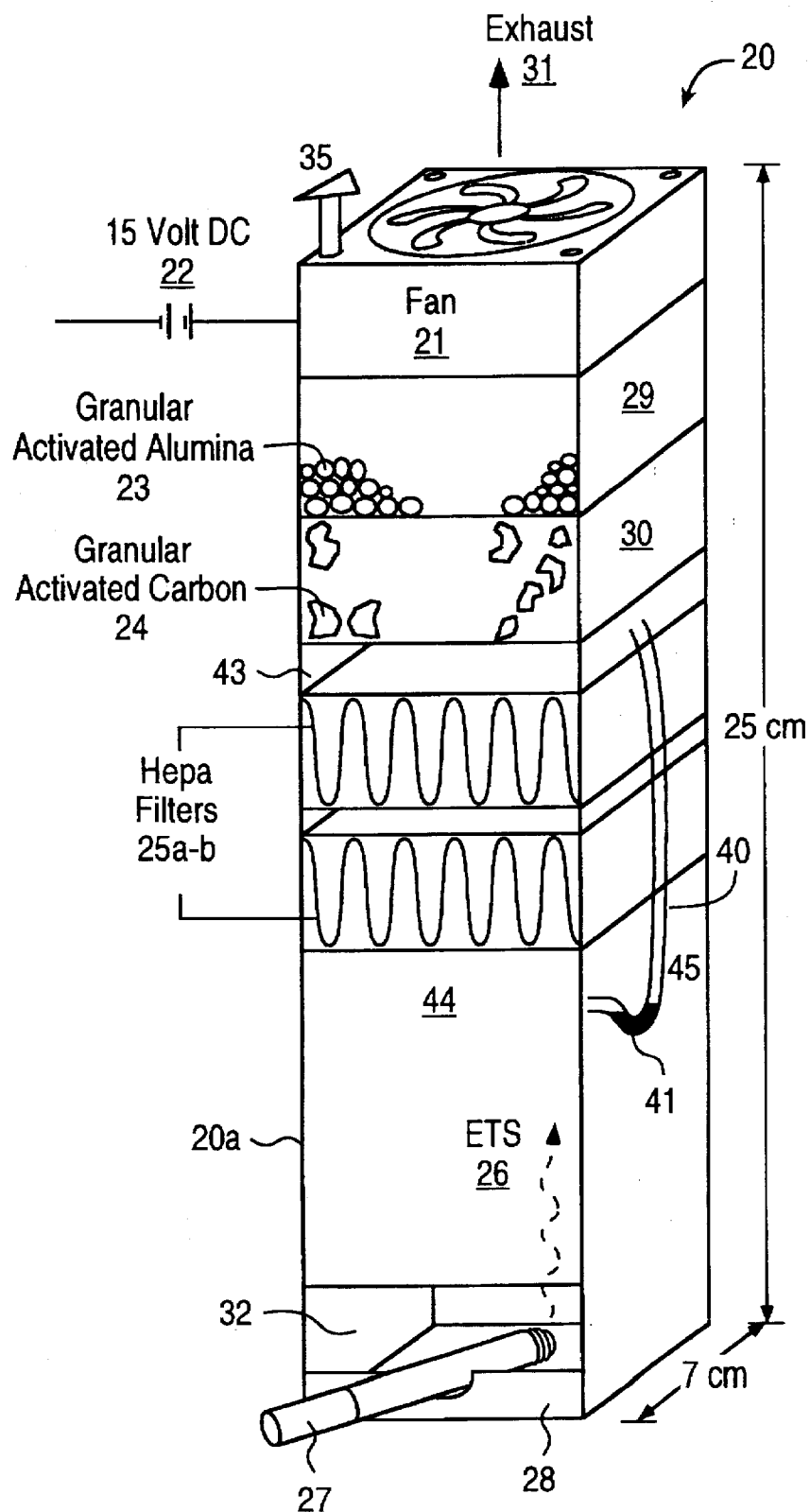
FIG. 2 illustrates an apparatus for reducing ETS particle and gas-phase contaminants according to the present invention.

FIGS. 7a–b illustrates concentrations of gas-phase contaminants species of eighteen species typically found in untreated or uncontrolled ETS, and after ETS passes through the apparatus shown in FIG. 2.

V. DETAILED DESCRIPTION OF THE INVENTION

Figure 1:
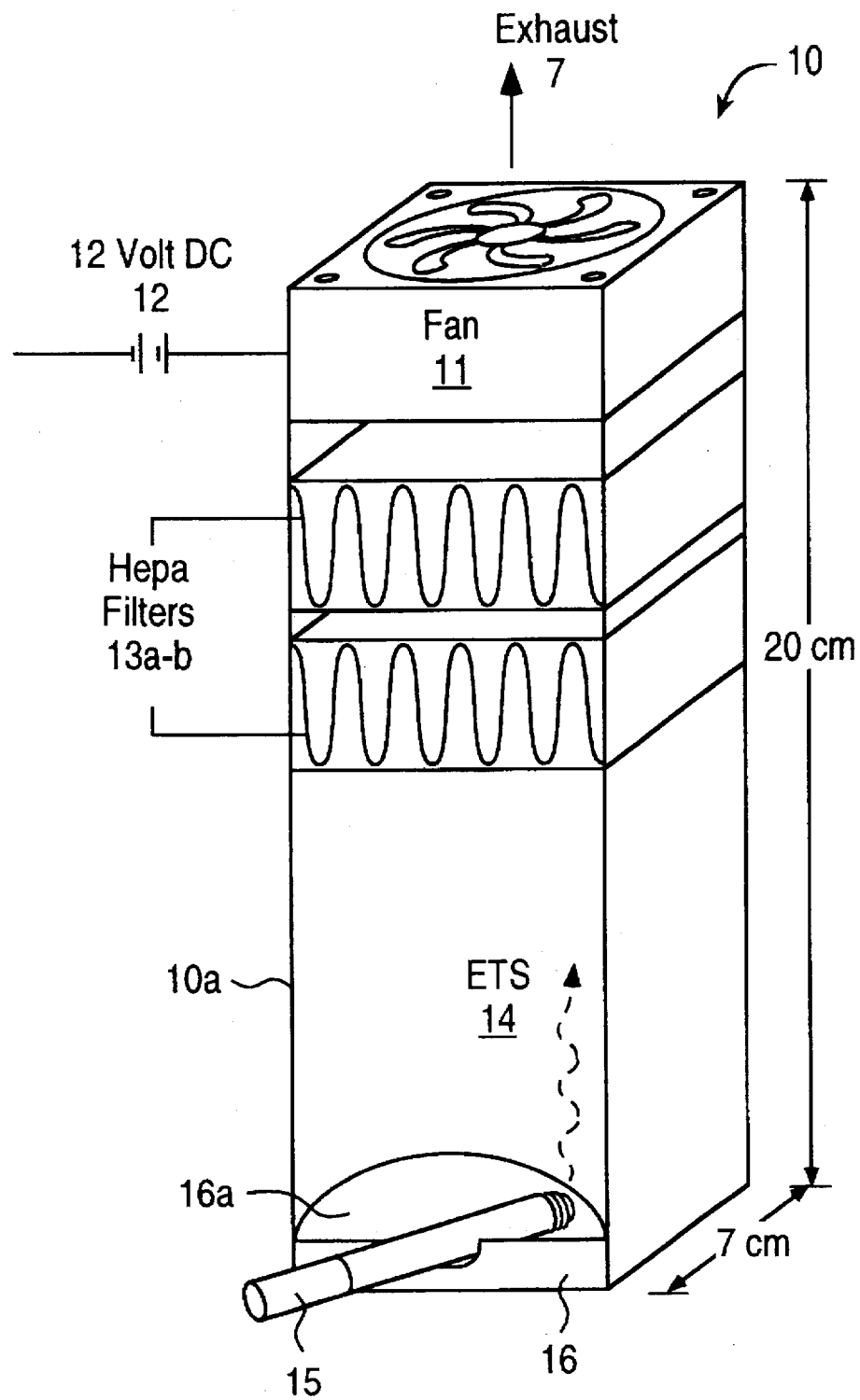
FIG. 1 illustrates an apparatus for reducing ETS particle contaminants according to the present invention.

FIG. 1 illustrates an apparatus 10 for treating ETS according to the present invention. Apparatus 10 comprises a housing 10a standing approximately 20 cm high having a 7 cm×7 cm square cross section.

A rigid particle board material is used for housing 20a. A disposable material may also be used. Most of the components housed within housing 10a are coupled using an adhesive. A sufficient amount of adhesive is used in order to prevent significant amounts of ETS from either escaping untreated from housing 10a, or bypassing the treatment process thereby enhancing the amount of ETS treated.

A tobacco product such as a cigarette, pipe, cigar, or the like may be placed in bottom 16 through opening 16a. For example, cigarette 15 is shown placed in bottom 16. Cigarette 15 generates ETS 14 (in particular sidestream smoke) which rises up through apparatus 10. The present invention is constructed such that the natural ascendancy of smoke is used advantageously in the treatment process of ETS 14. In typical smokeless ashtrays, smoke is drawn down or sideways through filters. This type of prior art design does not take advantage of ETS's natural tendency to rise. However, in the present invention apparatus 10 is designed to allow ETS 14 to rise naturally upward through filters 13a and 13b in addition to being directed by fan 11 across the filters. ETS particles are filtered and the filtered ETS 14 is exhausted through fan 11 as represented by exhaust 17.

In the preferred embodiment, filters 13a–b are glass fiber high efficiency particle air (HEPA) filters with a 2.5 cm pleat. The pleats provide additional surface area on filters 13a–b allowing for a smaller pressure drop across the filters and a lower fan-power use. The HEPA filters 13a–b may be obtained from Flander's Filters located at 7 Mt. Lassen Drive, Suite C-136, San Rafael, Calif. 94903.

A high efficiency particle air (HEPA) filter is defined as a filter which removes at least 95% of particles having a mean diameter of approximately 0.3μm as measured by the DiOctyl Pthalate (DOP) test outlined in U.S. Military Standard MIL-STD-282 (1956), incorporated by reference herein, and U.S. Army document 136-300-175A (1965), incorporated by reference herein. Other equivalent standard test methods to generate sub-micron aerosol particles of size distribution centered on 0.3 micron mass-median diameter include, but are not limited to, British, French and European test.

Moreover, the MIL-STD-282test is also outlined in the American Society of Heating, Refrigeration and Air-Conditioning Engineers (ASHRAE) Handbook of HVAC Systems, 1992, Chapter 25, pp. 25.3–25.5, incorporated by reference herein. In the ASHRAE Handbook at Chapter 25, various filters are classified in FIG. 4. In the preferred embodiment of the present invention, a high efficiency particle air (HEPA) filter having 95% efficiency by the DOP MIL-STD-282 test is classified as Group IV in FIG. 4.

Fan 11 operates on 12-volt DC battery 12. Fan 11, in the preferred embodiment, is a Toyo, model TFDD6012RXAL which may be obtained from U.S. Toyo fans located at 4915 Walnut Grove Avenue, San Gabriel, Calif. 91776.

FIG. 2 illustrates an additional embodiment of the present invention. Apparatus 20 is designed similarly to apparatus 10. Apparatus 20 comprises housing 20a which stands approximately 25 cm high having a 7 cm×7 cm square cross section.

A rigid particle board material is used for housing 20a. A disposable material may also be used. Most of the components housed within housing 20a are coupled using an adhesive. A sufficient amount of adhesive is used in order to prevent the release of significant amounts of ETS from the treatment process thereby enhancing the amount of ETS treated.

As above, a tobacco product represented by cigarette 27 may be placed in bottom 28 through opening 32. As with apparatus 10, ETS 26 from cigarette 27 rises naturally, and is further directed upward through filters 25a–b by fan 21. In the preferred embodiment, the filters 25a–b are HEPA filters defined above and have 2.5 cm pleats. Also, as above, the pleats are used to increase the filter area and thus reduce the expenditure of fan power. The glass fiber HEPA filters may be obtained from Flander's Filters located at 7 Mt. Lassen Drive, Suite C-136, San Rafael, Calif. 94903. However, unlike apparatus 10, means for removing ETS gas-phase contaminants are additionally employed in apparatus 20. A 2.5 cm thick layer of activated carbon 24 is positioned in compartment 30. In the present embodiment, activated carbon 24 may be obtained from International Air Filter located at 200 N. Spring St., Elgin, Ill. 60120. The activated carbon 24 is used to remove non-polar gasphase organics. Furthermore, a 1.8 cm thick layer of activated alumina 23 impregnated with 4% potassium permanganate is positioned, above compartment 30, in compartment 29. In the preferred embodiment, activated alumina 23 is Unisorb Mark II which may be obtained from Unisorb located at 1310 Genoa, South Houston, Tex. 77587. The activated alumina 23 is used to remove polar gas-phase organic compounds. Human exposure to these polar gas-phase organic compounds causes sensation of irritating odour, irritation of mucous membranes including redness in eyes and increased nasal mucous.

The activated carbon 24 and activated alumina 23 are granulated in order to increase the surface area in contact with the ETS 26. Granulated activated carbon 24 and granulated activated alumina 23 are included in apparatus 20 for filtering gas-phase, nonpolar and polar organic compounds, respectively, from tobacco combustion products. These vapor-phase controls are downstream of, and in series with the two filters 25a–b further taking advantage of the natural rising tendency of ETS 26. Finally, fan 21 is used to further direct ETS 26 across filters 25a–b, activated carbon 24, activated alumina 23, and eventually vertically from apparatus 20 as exhaust 31. A 15 volt DC battery 22 is used to power fan 21.

The particular physical order of activated alumina 23, activated carbon, and filters 25a–b in apparatus 20 was selected so that the filters 25a–b could first remove any particle contaminants having a boiling point near or above room temperature. These contaminants are in a solid phase. Several of them are in a semi-volatile solid state transitioning to a gas state or possibly generating gas-phase contaminants. Filtering these particles early in the treatment process before the particles contribute to gas-phase contaminants allows for a more efficient filter process.

The flow rate through filters 25a–b generated by fan 21, activated alumina 23 and activated carbon 24 is such that it will exceed by a large margin the natural volumetric flow rate in a cigarette plume. If this condition is not met, some of ETS 26 would escape through opening 32. This ensures that all the ETS 26 emanating from cigarette 27 is pulled through filters 25a–b, activated carbon 24 and activated alumina 23.

The effectiveness of smokeless ashtray 20 decreases as filters 25a–b are progressively clogged with ETS particle contaminants. However, an indicating tube 40 monitoring the pressure drop across filters 25a–b indicates the need for filter replacement before the flow rate across filters 25a–b drops to a critical value. This critical value is a small multiple of the typical volumetric volume flow in a cigarette plume (e.g. 20 cc/sec.). The indicating manometer tube 40 monitors the pressure difference across filters 25a–b for cloggage and its level changes in accordance with the pressure drop across the (two sides of) filters 25a–b.

Indicating tube 40 is coupled between filters 25a–b at position 44 and 43. Indicating tube 40 contains liquid 41 which demonstrates level 45 based upon the difference between the pressure at positions 43 and 44 in apparatus 20. Level 45 of liquid 41 will indicate an increase in pressure across the filters 25a–b when they get clogged and thus indicate the need to replace the filters.

Apparatus 20 may include a 3-way switch. In the OFF position, the apparatus will be switched OFF and disconnected from the DC battery. In the STANDBY or AUTO position, the apparatus will be activated for 6 minutes following introduction of a cigarette 27 in the bottom 28. For these 6 minutes the fan will remain activated. Furthermore, an alarm will signal within this period if the cigarette 27 is removed from the bottom 28 for more than 5 seconds, thus reminding the smoker to return cigarette 27 to apparatus 20 after each puff. In the third, ON, position, the fan will be activated continuously and the alarm will be disabled. The preferred mechanism to sense the placement/removal of cigarette 27 in bottom 28 is a photoelectrical switch. The preferred alarm mechanism to request return of cigarette 27 to bottom 28 is an auditory beeping signal.

Finally, a small, high intensity lamp 35 is coupled to 15-volt DC battery 22 and directed toward exhaust 31 in order to visibly demonstrate the filtering process of apparatus 20 to users. The light from high intensity lamp 35 will illustrate a relatively ETS-free exhaust 31.

A. Comparisons With Commercially Available Smokeless Ashtrays

The effectiveness of removing ETS particle and gas-phase contaminants by the present invention was compared with commercially available smokeless ashtrays. The present embodiments shown in FIG. 1 and FIG. 2 (hereinafter "SA-3" and "SA-4", respectively) were compared with two commercially available smokeless ashtrays (hereinafter "SA-1" and "SA-2"), which are constructed similarly to the smokeless ashtrays described in U.S. Pat. Nos. 4,043,776 and 5,259,400, respectively. As seen by the following data and analysis, the present invention substantially improves the removal of ETS particle and gas-phase contaminants compared with commercially available smokeless ashtrays.

1. ETS Particle Contaminants Filtering

Figure 3A:
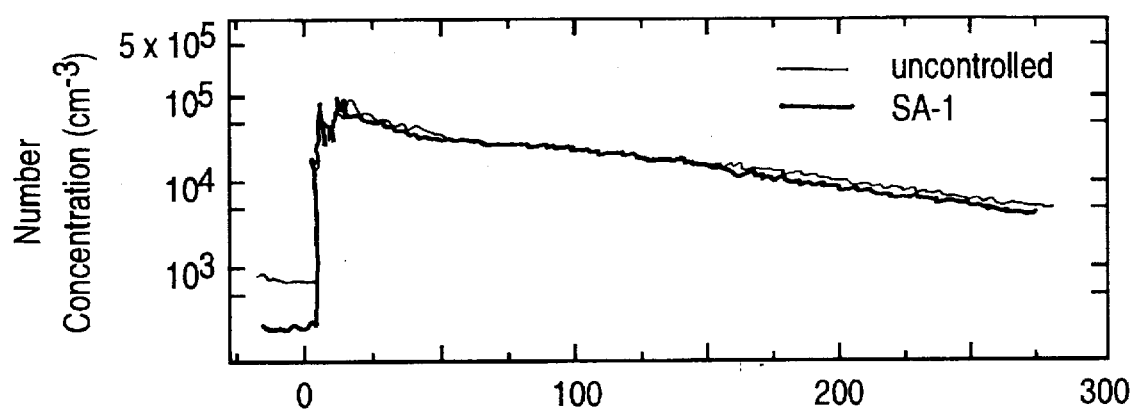
FIG. 3 illustrates graphically ETS particle concentration versus time after ETS passes through the apparatus shown in FIG. 1 as compared to commercially available smokeless ashtrays and as compared to untreated or uncontrolled ETS.
Figure 3B:
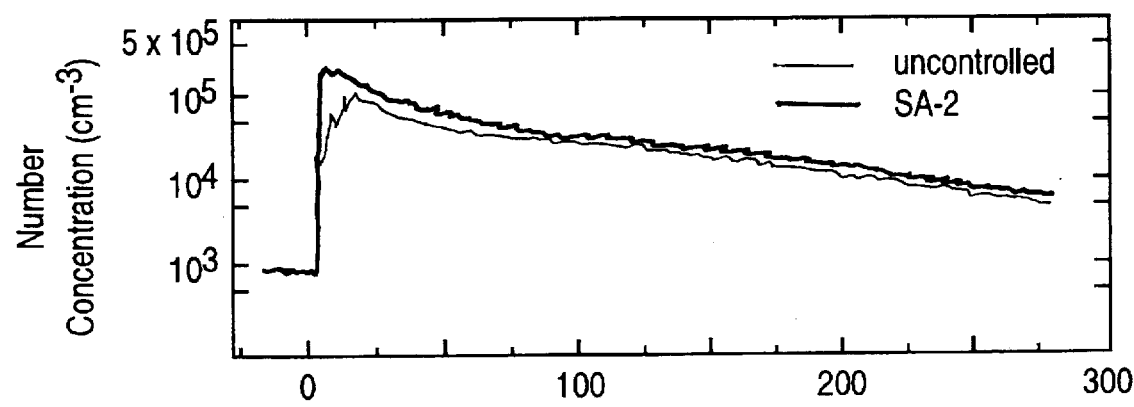
Figure 3C:
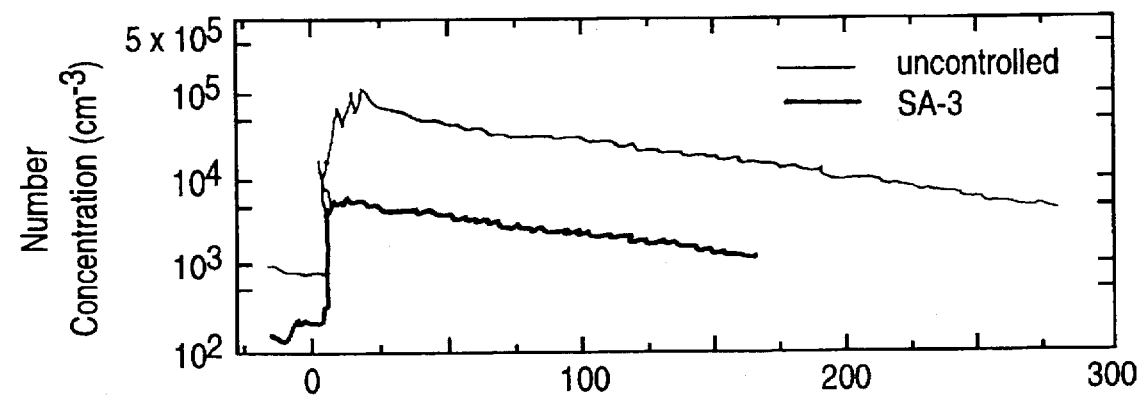

ETS particle number concentration reduction versus time using SA-3, SA-1 and SA-2 are shown in FIG. 3. The bold line represents particle concentrations using SA-1, SA-2 and SA-3. The fine line represents the uncontrolled (SA-1, SA-2, or SA-3 are not used to treat ETS emissions) smoldering cigarette. Reduction of ETS particle contaminants for each smokeless ashtray (SA-1, SA-2, and SA-3) are compared to ETS particle contaminants generated from the uncontrolled smoldering cigarette. In each case, a cigarette was lit at t=0 minutes and burned for approximately six minutes. Background particle number concentrations can be seen for the first twenty minutes prior to lighting the cigarette. Differences in the initial particle concentrations are due to the different lengths of time that the test room had been purged with particle-free air prior to cigarette ignition. Once the generation of ETS particle contaminants ceased, and the ETS particle contaminants in the room became well mixed (~0.5 h), the ETS particle concentration followed a typical exponential decay. The two commercially available ashtrays SA-1 and SA-2 are shown to be substantially ineffective at removing ETS particle contaminants on a number basis. In fact, for SA-2, the ETS number concentration is greater when using SA-2 than without it. This increase may be due to the vigorous mixing of ETS with air flow in SA-2 inhibiting particle coagulation in the smoke plume. The ETS particle number concentration after using SA-1 is almost identical to that from the uncontrolled smoldering cigarette. In direct contrast, SA-3 showed an order of magnitude reduction in ETS particle number concentration compared to the uncontrolled smoldering cigarette.

The ventilation rates for these comparisons varied from 0.7 $h^{-1}$ to 0.9 $h^{-1}$ as shown in Table I below:

TABLE I

Measured air exchange rates and particle concentrations for chamber experiments.

| EXPERIMENT | AIR EXCHANGE RATE [H$^{-1}$] | ONE HOUR AVERAGE CONCENTRATION OF ETS PARTICLES IN ROOM [mg m$^{-3}$] |
|---|---|---|
| smoldering cigarette (uncontrolled) | 0.8 | 54 |
| SA-1 | 0.9 | 26 |
| SA-2 | 0.7 | 35 |
| SA-3 | 0.9 | 4 |

The third column in Table I represents the first-hour-since-combustion average particle mass concentrations in a room. On a mass basis, the overall removal efficiency was 52% for SA-1 and 35% for SA-2. SA-3 had a particle mass removal efficiency of greater than 92%.

Figure 4B:
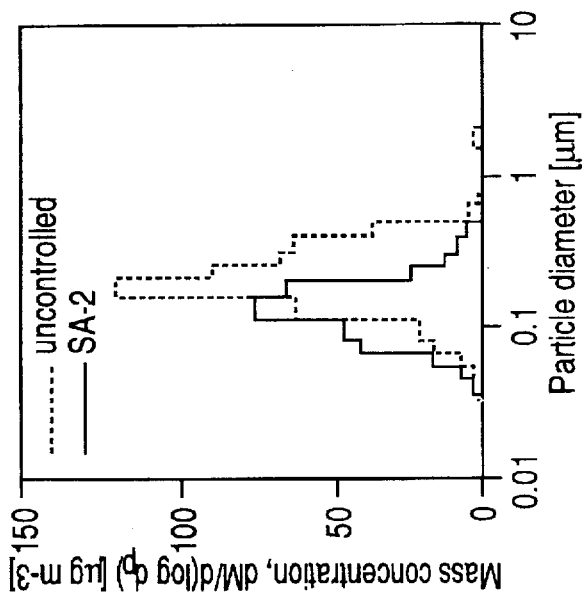
FIG. 4 illustrates ETS particle mass distributions after ETS passes through the apparatus shown in FIG. 1 as compared to commercially available smokeless ashtrays and as compared to untreated or uncontrolled ETS.
Figure 4C:
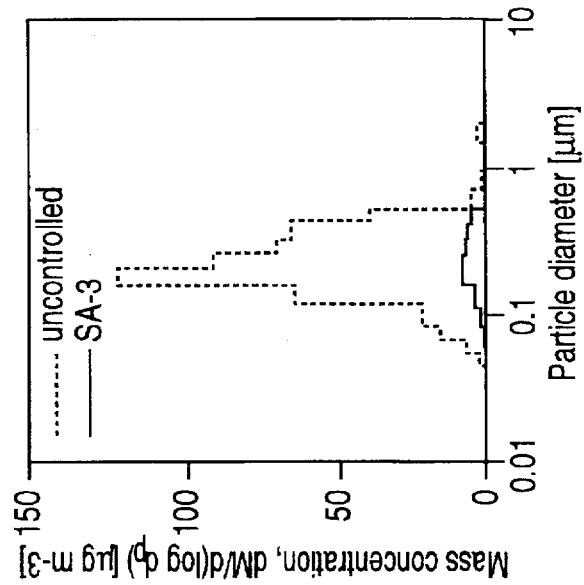
Figure 4A:
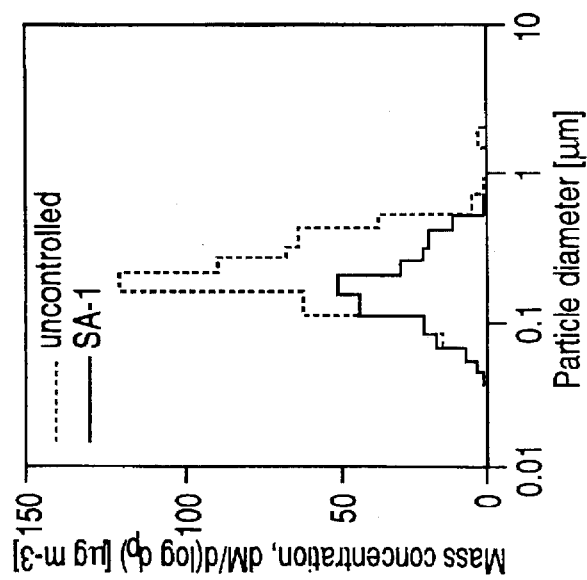

FIG. 4 illustrates the first-hour-since-combustion average particle mass distribution for SA-1, SA-2 and SA-3 in comparison with the uncontrolled smoldering cigarette. The uncontrolled smoldering cigarette mass distribution is illustrated by dotted lines. ETS particle number distributions by size obtained using optical particle counter and differential mobility analyzer were converted to mass distributions assuming a constant particle density of 1.2 g cm$^3$. Sampling began with cigarette ignition and occurred in a closed 36 m$^3$ room with an air-exchange rate of 0.7 to 0.9 h$^{-1}$. One-hour and 2.5-hour (not shown) average mass distributions commencing with cigarette ignition were calculated for SA-1, SA-2, SA-3, and the uncontrolled smoldering cigarette. Distributions for the first 2.5 hour interval are similar in shape to the one-hour distributions. The mass distribution for SA-1 shows ~60% reduction in particle mass for particle sizes >0.1 µm. For SA-2, a shift in the particle mass distribution can be seen: there is greater mass concentration of particles less than ~0.3 µm for SA-2 than for the uncontrolled smoldering cigarette. For SA-3, the mass distribution occurs in approximately the same range as the uncontrolled smoldering cigarette, but the mass concentration is an order of magnitude lower.

Figure 5:
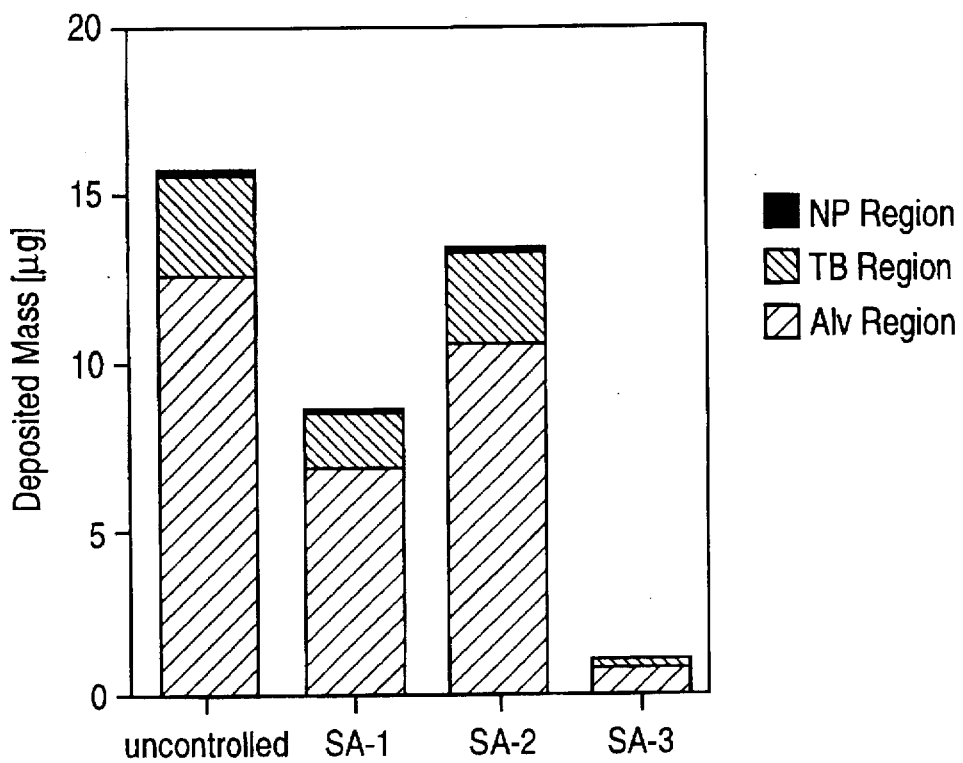
FIG. 5 illustrates a predicted total mass deposit in the nasopharyngeal (NP), tracheobronchial (TB), and alveolar (Alv) regions of a human lung after one hour of exposure to ETS filtered through the apparatus shown in FIG. 1 as compared to commercially available smokeless ashtrays, and as compared to inhalation of untreated or uncontrolled ETS.

Predictions for the amount of ETS particle contaminants deposited in a typical 30 year old male human lung using SA-1, SA-2, SA-3 and the uncontrolled smoldering cigarette are shown in FIG. 5. A lung deposition model described in W. W. Nazaroff, W. Y. Hung, A. G. B. M. Sasse and A. J. Gadgil, "Predicting Regional Lung Deposition of Environmental Tobacco Smoke Particles," Aerosol Science and Technology, 19: 243 (1993), which is incorporated by reference herein, was used. As expected, the largest mass of deposited ETS particle contaminants 15.7 µg occurred for the uncontrolled smoldering cigarette. The predicted total mass deposited in a human lung when using SA-1 and SA-2 were 8.9 and 13.4 µg respectively. As for SA-3, lung deposition predictions were 1.1 µg, an order of magnitude lower than the other smokeless ashtrays. The partitioning of the total mass deposited among the various regions of the lung is similar for each of the four cases, with approximately 80% of the particle mass depositing in the alveolar region of the lung.

2. ETS Gas-Phase Contaminants Filtering

As with the reduction of ETS particle contaminants shown above, the present invention substantially improves the reduction of ETS gas-phase contaminants. The effectiveness of removing gas-phase contaminants was determined by sampling three types of ETS gas-phase species during the operation of apparatus 20 (or SA-4) and comparing the results to an uncontrolled smoldering cigarette. The sampled species include nicotine, 3 aldehydes and 19 volatile organic compounds (VOCs). The VOCs were acrolein, acrylonitrile, 1,3-butadiene, 2-butanone, pyridine, pyrrole, benzene, toluene, styrene, m,p-xylene, o-xylene, 3-vinylpyridine, m,p-cresol, o-cresol, phenol, butyraldehyde, 3-methyl-1-butanol, ethyl acetate, ethyl acrylate, and butyl acetate.

Figure 6:
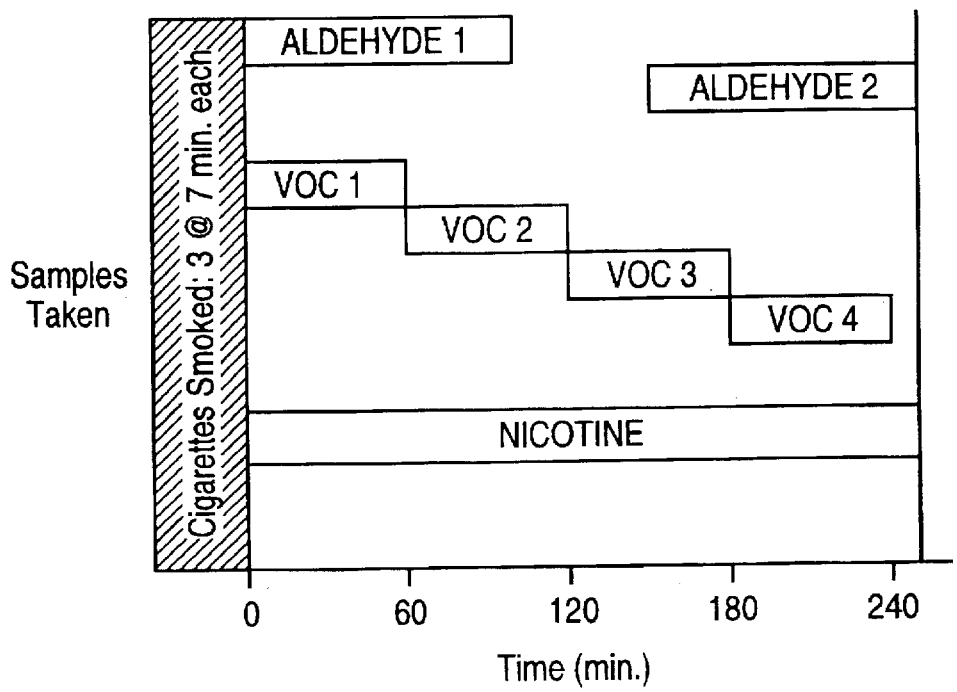
FIG. 6 illustrates the sample periods used for obtaining concentrations of specific gas-phase contaminants when using the present invention.

FIG. 6 shows the number and types of samples taken during each of the three gas-phase measurements. A measurement was conducted with SA-4 and two measurements were conducted without any treatment of ETS (uncontrolled condition). In each measurement, three cigarettes were smoked consecutively inside a unventilated chamber using a smoking machine. The average chamber concentration of eighteen gas-phase contaminants were measured in a 20 m$^3$ stainless steel environmental chamber. As shown in FIG. 6, four VOC samples, two aldehyde samples and one nicotine sample were taken during each measurement. Each sample was separately analyzed and individual gas-phase contaminant concentrations were determined.

The removal efficiency of ETS gas-phase contaminants for SA-4 was determined by the equation:

$$\eta = \frac{C_{reference} - C_{controlled}}{C_{reference}} \tag{1}$$

Where $C_{reference}$ is a gas-phase contaminant concentration for the reference or uncontrolled condition and $C_{controlled}$ is a gas-phase contaminant concentration using SA-4. In general, $C_{reference}$ and $C_{controlled}$ represent time average measurements over a sampling period relative to cigarette combustion that is the same for the reference and the controlled cases. Thus, if the concentration using SA-4 for a particular gas-phase contaminant is only 0.01 times the concentration in absence of filtering ($C_{reference}$), the efficiency of filtering for SA-4 for the gas-phase contaminants is (1−0.01), i.e. 99%.

FIGS. 7a–b show the average gas-phase concentrations of eighteen gas-phase contaminants measured in the 20 m$^3$ environmental chamber using equation 1. Clearly, there is significant reduction in the concentrations of all gas-phase contaminants when SA-4 is used. Based on average VOC concentrations, the removal efficiency of SA-4 was ~70% to >95%. Additionally, the removal efficiencies for formaldehyde, acetaldehyde, and acrolein were approximately 93%, 77% and 72% respectively, and nicotine was removed with an efficiency of approximately 95%.

The following five gas-phase contaminants are not shown in FIGS. 7a–b because they were below the listed detection limits in the controlled measurements, and those with SA-4: butyraldehyde and 3-methyl-1-butanol (detection limits of 2.5 µg m$^{-3}$); ethyl acetate, ethyl acrylate and butyl acetate (detection limits of 0.5 µg m$^3$).

The average gas-phase contaminant concentrations shown in FIGS. 7a–b using SA-4 were calculated by averaging the concentrations from each sample (i.e. for VOC species, four sample results were averaged; for aldehydes, two results were averaged). For the two uncontrolled measurements, the two nicotine sample results were averaged for a nicotine average and the four aldehyde sample results were averaged for the individual aldehyde species. The four VOC gas-phase contaminants were averaged in the same manner as in the controlled measurement. Error bars for cresols, 3-vinylpyradine and phenol are large in the uncontrolled experiment due to observed decreases in concentration over the four hour sampling. These gas-phase contaminants may react on the stainless steel walls of the environmental chamber room causing the reduction in the chamber concentrations. Additionally, in the controlled experiment, these gas-phase contaminants may easily adsorb onto the various filter media which could account for the chamber concentrations below detection limits.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A smokeless ashtray for filtering particle and gas-phase contaminants in tobacco smoke, comprising:

a handheld housing having a top and a bottom, the bottom used for positioning a tobacco product;

a fan, positioned in the top of the housing, for directing the tobacco smoke upward;

a layer of activated alumina, positioned in the housing and positioned below the fan, for filtering gas-phase contaminants in the tobacco smoke;

a layer of activated carbon, positioned in the housing and positioned below the fan, for filtering gas-phase contaminants in tobacco smoke;

a high efficiency particle air filter, positioned in the housing and positioned below both the layer of activated alumina and the layer of activated carbon, for filtering particle contaminants in the tobacco smoke; and, means, coupled to the housing, for indicating filtered tobacco smoke.

2. The smokeless ashtray of claim 1, wherein the smokeless ashtray further comprises:

means, coupled to the housing, for indicating a need for replacement of the high efficiency particle air filter when the high efficiency particle filter contains a significant amount of particle contaminants.

3. A smokeless ashtray for filtering particle and gas-phase contaminants in tobacco smoke, comprising:

a handheld housing having a top and a bottom, the bottom used for positioning a tobacco product;

a fan, positioned in the top of the housing, for directing the tobacco smoke upward;

a layer of activated alumina, positioned in the housing and positioned below the fan, for filtering gas phase contaminants in the tobacco smoke;

a layer of activated carbon, positioned in the housing and positioned below the fan, for filtering gas-phase contaminants in tobacco smoke;

a high efficiency article air filter, positioned in the housing and positioned below both the layer of activated alumina and the layer of activated carbon, for filtering article contaminants in the tobacco smoke; and, means, coupled to the housing, for generating an alarm in response to removing a tobacco product from the housing bottom after a period of time.

* * * * *

UNITED STATES PATENT AND TRADEMARK OFFICE
CERTIFICATE OF CORRECTION

PATENT NO. : 5,678,576
DATED : October 21, 1997
INVENTOR(S) : Nazaroff et al.

It is certified that error appears in the above-indentified patent and that said Letters Patent is hereby corrected as shown below:

Column 7, line 28, change "$cm^3$" to --$cm^{-3}$--.

Column 8, line 55, change "$m^3$" to --$m^{-3}$--.

Column 10, line 27, change "article" to --particle--.

Column 10, line 30, change "article" to --particle--.

Signed and Sealed this

Third Day of February, 1998

BRUCE LEHMAN

*Attest:*

*Attesting Officer*     *Commissioner of Patents and Trademarks*